United States Patent [19]

Beaudoin

[11] Patent Number: 5,286,104
[45] Date of Patent: Feb. 15, 1994

[54] QUICK RELEASE FEEDING APPARATUS FOR AN EXTRUDER

[76] Inventor: Joseph R. Beaudoin, 53 Fillmore St., Chicopee, Mass. 01020

[21] Appl. No.: 65,706
[22] Filed: May 24, 1993
[51] Int. Cl.⁵ .............................................. B28C 7/04
[52] U.S. Cl. .................................... 366/76; 193/2 A; 366/183
[58] Field of Search ...................... 366/76, 79, 77, 150, 366/183, 68, 41, 184; 193/2 A, 30, 2 R; 425/207, 208, 209

[56] References Cited

U.S. PATENT DOCUMENTS

| | | | |
|---|---|---|---|
| 1,625,576 | 4/1927 | Stacy | 193/30 |
| 4,125,195 | 11/1978 | Sasadi | 193/30 |
| 4,195,934 | 4/1980 | Spanier | 366/76 |
| 5,096,302 | 3/1992 | Durina | 366/76 |

Primary Examiner—Robert W. Jenkins
Attorney, Agent, or Firm—Chapin, Neal & Dempsey

[57] ABSTRACT

Disclosed is an apparatus for feeding material from a hopper to an extruder choke. The apparatus comprises a Y-shaped feeder section having an inlet portion and an outlet portion capable of being sealably connected and disconnected to the extruder choke. The apparatus further comprises an extension arm having a first end configured to be positioned into and out of sealable contact with the inlet portion of the feeder section and a second end configured to engage with the hopper. In operation, when the hopper is opened, material is fed into the extension arm, through the feeder section and into the extruder head.

4 Claims, 3 Drawing Sheets

QUICK RELEASE FEEDING APPARATUS FOR AN EXTRUDER

FIELD OF THE INVENTION

The present invention relates generally to manufacturing apparatus and more particularly, to an apparatus for feeding materials such as plastic to an extruder.

BACKGROUND OF THE INVENTION

A large variety of plastic products are made by extruders which generally consist of forcing a plastic material through a suitably shaped die to produce a desired cross-section shape. The extruding force may be applied by a piston or ram or by a rotating screw. Regardless of the type of extruder used, the raw plastic materials (usually in the form of small plastic beads) must be supplied to an inlet feed or extruder choke normally located at the top of an extruder head.

Conventional apparatus for supplying the plastic material to the extruder choke includes a hopper adapted to store the plastic material and a feeder section adapted to transport the plastic material from the hopper to the extruder choke. Conventional feeders generally employ numerous bolt and flange connections to connect the feeder to the extruder choke. Apparatus of this type, however, have several drawbacks. One such drawback is that the apparatus cannot be easily disconnected for cleaning or other maintenance operations which leads to decreased production capacity.

SUMMARY OF THE INVENTION

The present invention is a feeding apparatus adapted to feed materials such as plastic from a hopper to an extruder choke where the materials are subsequently processed. The feeding apparatus generally comprises a feeder section having one end which may be easily rotated into and out of sealable contact with the extruder choke. The apparatus further comprises an adjustable extension arm which is provided to sealably connect the hopper to the other end of the feeder section. With the apparatus of the present invention, an operator can quickly disconnect the apparatus for routine maintenance operations and reconnect the same thereby minimizing downtime during production runs. Moreover, the apparatus of the present invention is completely sealed so as to minimize the leakage of material during processing.

BRIEF DESCRIPTION OF THE DRAWINGS

The following detailed description will become better understood with reference to the accompanying drawings in which.

DETAILED DESCRIPTION OF THE PREFERRED EMBODIMENTS

Figure 1:
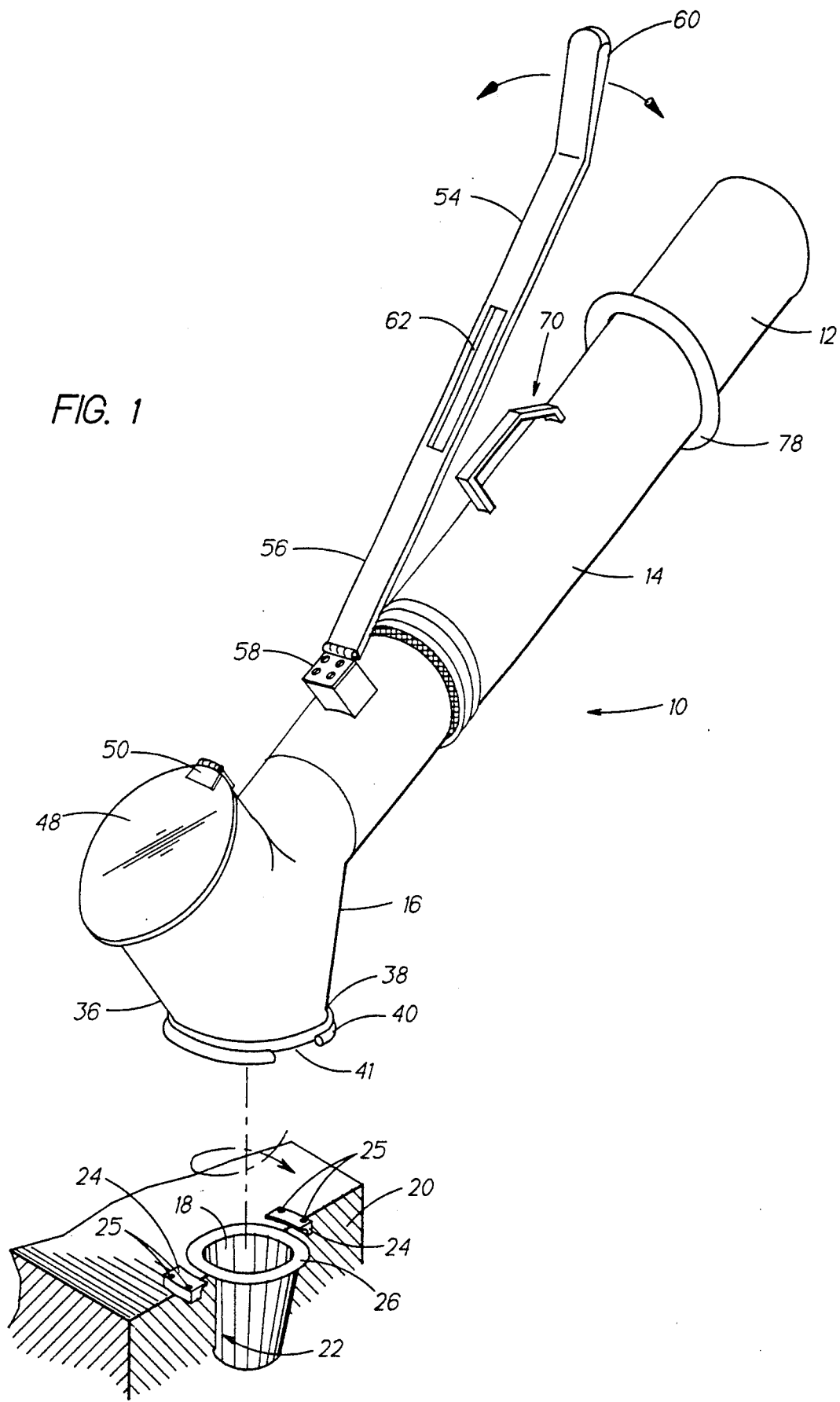
FIG. 1 is a perspective view of the present invention.
Figure 2:
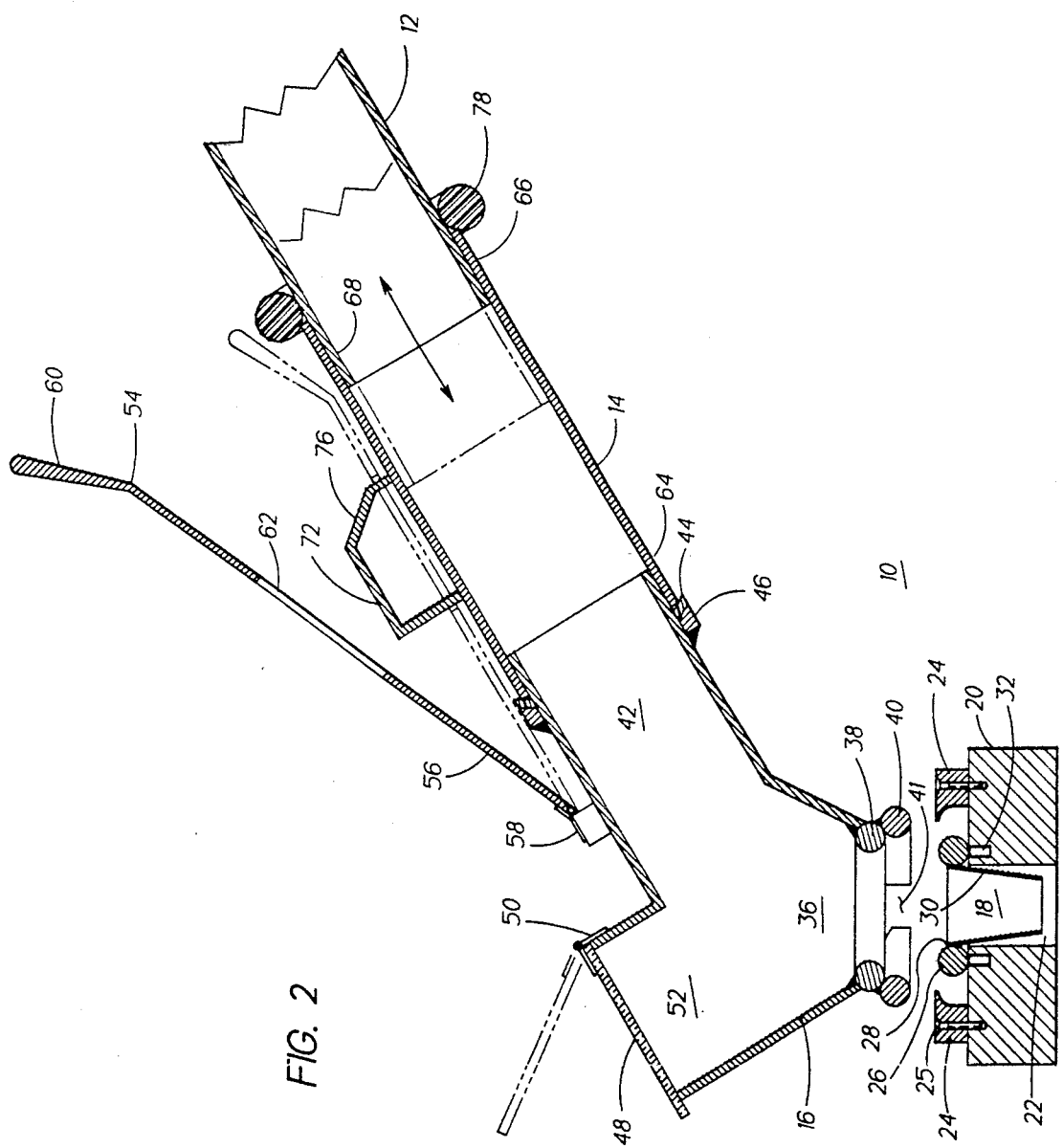
FIG. 2 is a cross-section view taken along line A—A of FIG. 1.
Figure 3:
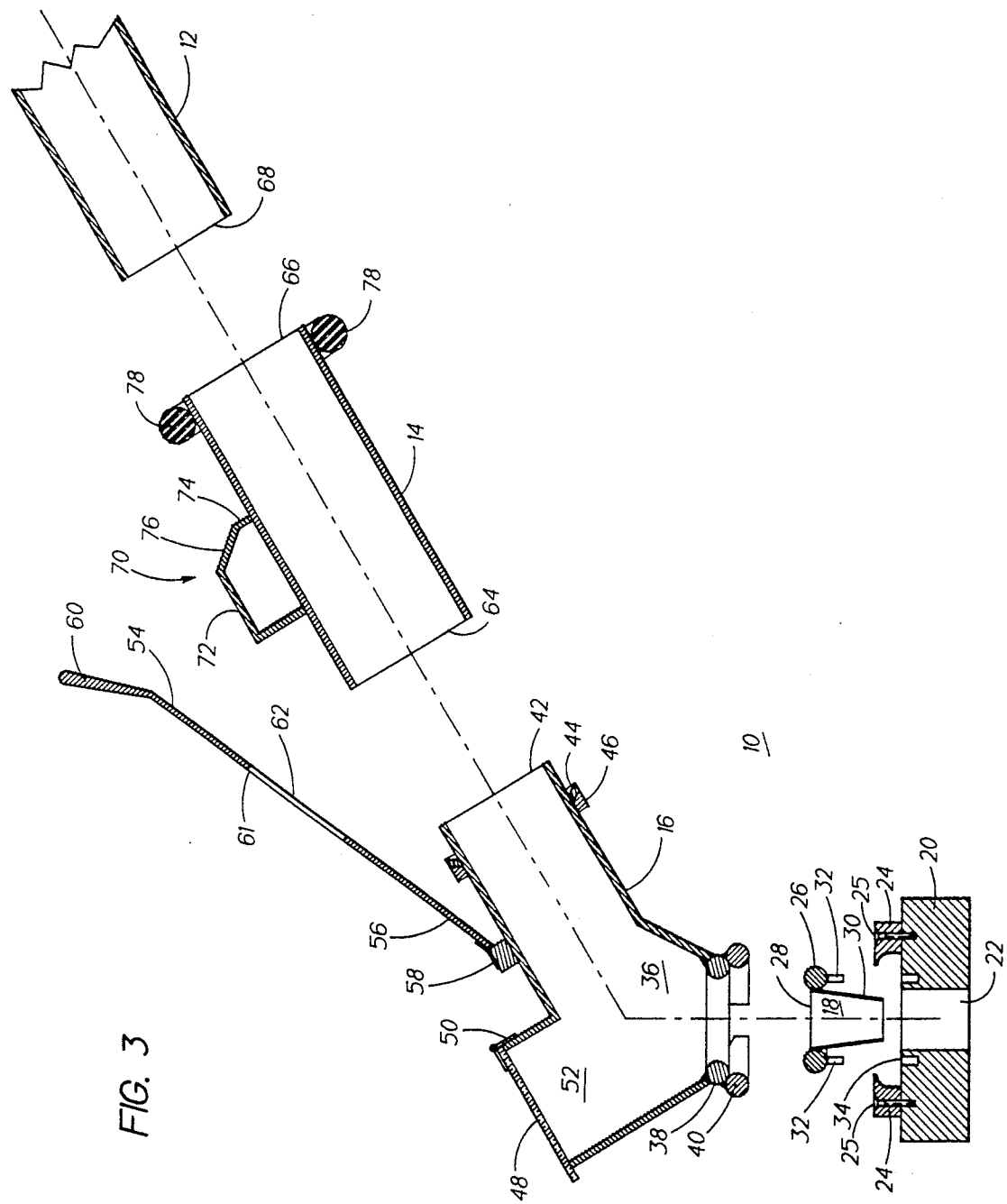
FIG. 3 is an exploded view showing the various components of the present invention.

Referring to FIGS. 1-3, the present invention is a feeding apparatus 10 which generally operates to transport material such as plastic, from an elevated hopper arm 12 through an adjustable extension arm 14, to a feeder section 16, and to an extruder choke 18 positioned in an extruder head 20. As will described more fully herein, an operator can easily assemble and disassemble the feeding apparatus 10 to perform routine cleaning or other maintenance operations while minimizing downtime during production.

The extruder head 20 is shown in partial view and is part of a larger extruder machine (not shown). The extruder head 20 is formed with an opening 22 adapted to receive the extruder choke 18. The extruder head 20 is also formed with a pair of retainers 24 which are secured to extruder 20 by fasteners 25 and which as will described more fully herein, are adapted to secure feeder section 16 in sealable contact with the extruder choke 18.

The extruder choke 18 comprises a metal o-ring 26 welded to the upper end 28 of a cone shaped portion 30. The o-ring 26 is preferably formed with two metal pins 32 extending from and positioned at opposite points about perimeter of o-ring 26 and which engage with recesses 34 provided in the extruder head 20 to thereby prevent rotation of the extruder choke 18.

Feeder section 16 is generally of Y-shaped construction and comprises a circular shaped outlet portion 36 which in the embodiment shown is made up of metal o-rings 38 and 40 which are welded together. O-ring 40 is formed with two splits or cut-outs 41 having a width large enough to freely fit over retainers 24. The diameter and position of o-ring 40 relative to o-ring 38 is such that a portion of o-ring 40 is outwardly facing and will rotatably engage with retainers 24 when feeder section 16 is rotated, thereby sealably connecting the outlet portion 36 to the extruder choke 18. This feature of present invention provides a simple and yet effective way of quickly removing the feeder section 16 into and out of sealable contact with the extruder choke 18 while at the same time providing a sealed contact so that no material will escape during production.

Feeder section 16 further comprises a circular shaped inlet end 42 having a polymeric member 44 adhesively fastened to a metal retainer or ring 46 welded adjacent to end 42 to provide a means for sealably connecting inlet end 42 to the extension arm 14. The feeder section 16 further comprises a cover or flap 48 which is hingedly connected by a hinge 50. Cover 48 is provided so that an operator may inspect the interior region of feeder section 16 to ensure, for example, that there is no "clogging" of the material. Feeder section 16 is further provided with a latching member or handle 54 having an end 56 hingedly connected by a hinge 58 to feeder section 16 and an upwardly inclined second end 60 which may be actuated by the operator. The latching member 54 also comprises an elongated opening 62 which as will be more fully described herein, is configured to engage with a cam and retaining mechanism 70 extending outward of extension arm 14.

The extension arm 14 is generally of uniform cylindrical construction and has a first end 64 and a second end 66, each having an inside diameter sized to telescopically slide over ends 42 of feeder section 16 and an end 68 of hopper arm 12. The cam and retaining mechanism 70 generally comprises an upper portion 72, a base portion 74 and a sloped side wall 76 extending from the upper portion 72 to the base portion 74. The cam and retaining mechanism 70 is configured to move the extension arm 14 into sealable contact with the feeder section 16 as a forward edge 61 of the opening 62 is engaged with side wall 76. End 66 of the extension arm 14 is positioned in sealable contact with end 68 of the hopper arm 12 by the use of a movable rubber gasket or o-ring 78.

To connect the feeding apparatus 10, an operator would first position feeder section 16 such that cut-outs 41 of o-ring 40 are placed over retainers 24. Thereafter, the feeder section 16 may be rotated to move o-ring 40 into engagement with the retainers 24 to thereby connect feeder section 16 in sealable contact with extruder choke 18. Thereafter, the extension arm 14 would be telescopically positioned with respect to hopper arm 12 so that it could be brought into engagement with end 42 of feeder section 16. Thereafter, the latching member 54 is lowered over the cam and retaining mechanism 70 to thereby drive the extension arm 14 into sealable contact with the polymeric member 44 positioned adjacent end 42 of the feeder section 16. Thereafter, the position of end 66 of extension arm 14 relative to hopper arm 12 is fixed and the gasket 78 may be moved into a position over both end 66 of extension arm 14 and end 68 of hopper arm 12 to thereby seal that portion of the feeding apparatus 10.

To disconnect the feeding apparatus 10, the operator would first slide gasket 78 over the extension arm 14 and disengage latching member 54 from the cam and retaining mechanism 70. Thereafter, the operator would slide extension arm 14 over hopper arm 12, thereby proving sufficient space for the operator to rotatably disengage feeder section 16 from the retainers 24 thereby allowing the feeder section to removed from the extruder choke 18.

The foregoing description has been for illustrative purposes only. As will be obvious to one skilled in the art, the present invention may be readily modified without departing from the spirit and scope of the invention as defined by the following claims.

What is claimed:

1. An apparatus for feeding material from a hopper to an extruder choke comprising:
   an extruder head;
   an extruder choke connected to said extruder head;
   a feeder section having an inlet portion and an outlet portion capable of being sealably connected and disconnected to said extruder choke; and
   an extension arm having a first end configured to be positioned into and out of sealable contact with said inlet portion of said feeder section and a second end configured to sealably engage with the hopper,
   whereby when the hopper is opened, material is fed into said extension arm through said feeder section and into said extruder head.

2. The apparatus of claim 1, wherein said outlet portion of said feeder section comprises a first o-ring connected to a second o-ring.

3. The apparatus of claim 2, wherein said extruder choke comprises an o-ring having at least two mounting pins adapted to engage with said extruder head.

4. The apparatus of claim 3, wherein said extruder head comprises at least two retainer adapted to engage with said second o-ring of said outlet portion such that when said feeder section is rotated to a first position said outlet portion is in sealable contact with said extruder choke and when said feeder is rotated to a second position said outlet portion can be disengaged from said extruder choke.

* * * * *